United States Patent
Andres

(10) Patent No.: US 9,912,021 B2
(45) Date of Patent: Mar. 6, 2018

(54) ELECTRICAL STORAGE DEVICE THERMAL MANAGEMENT SYSTEMS

(71) Applicant: Michael J. Andres, Roscoe, IL (US)

(72) Inventor: Michael J. Andres, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1000 days.

(21) Appl. No.: 13/896,529

(22) Filed: May 17, 2013

(65) Prior Publication Data

US 2014/0342201 A1  Nov. 20, 2014

(51) Int. Cl.
| | | |
|---|---|---|
| *H01M 10/50* | (2006.01) | |
| *H01M 10/66* | (2014.01) | |
| *H01G 2/08* | (2006.01) | |
| *H01M 10/6551* | (2014.01) | |
| *H01M 10/6567* | (2014.01) | |

(Continued)

(52) U.S. Cl.
CPC .......... *H01M 10/5093* (2013.01); *H01G 2/08* (2013.01); *H01G 11/18* (2013.01); *H01G 11/78* (2013.01); *H01M 2/1077* (2013.01); *H01M 10/613* (2015.04); *H01M 10/63* (2015.04); *H01M 10/658* (2015.04); *H01M 10/6551* (2015.04); *H01M 10/6554* (2015.04); *H01M 10/6567* (2015.04); *H01M 10/6569* (2015.04); *H01M 2/1241* (2013.01);
(Continued)

(58) Field of Classification Search
CPC .......... H01M 10/5093; H01M 10/613; H01M 10/6567; H01M 10/66; H01M 10/5004; H01M 10/5075; H01M 10/625; H01M 10/6551; H01M 10/658
See application file for complete search history.

(56) References Cited

U.S. PATENT DOCUMENTS 3,837,918 A * 9/1974 Nakabayashi .... H01M 10/3909
429/104
6,087,036 A * 7/2000 Rouillard .............. H01M 2/202
429/120

(Continued)

FOREIGN PATENT DOCUMENTS

DE  102009028271 A1  2/2011
DE  102009045271 A1  4/2011
(Continued)

OTHER PUBLICATIONS

Search Report and Opinion issued by the European Patent Office dated Sep. 23, 2014 for European Patent Application No. 14168843.

*Primary Examiner* — Jimmy K Vo
(74) *Attorney, Agent, or Firm* — Locke Lord LLP; Scott D. Wofsy; Christopher J. Cillié

(57) ABSTRACT

A thermal management system for a high density power source is disclosed. The system includes a housing with an interior divided into first and second compartments. The first compartment is configured and adapted to house at least one electrical battery and the second compartment defines a coolant reservoir. A fluid release member connects the first and second compartments. Upon the first compartment reaching a temperature in excess of a predetermined limit, the fluid release member releases coolant form the second compartment into the first compartment to cool the at least one battery within the first compartment.

20 Claims, 3 Drawing Sheets

(51) Int. Cl.
H01M 10/613 (2014.01)
H01M 10/658 (2014.01)
H01G 11/18 (2013.01)
H01G 11/78 (2013.01)
H01M 2/10 (2006.01)
H01M 10/63 (2014.01)
H01M 10/6569 (2014.01)
H01M 10/6554 (2014.01)
H01M 2/12 (2006.01)
H01M 10/625 (2014.01)
H01M 10/643 (2014.01)

(52) U.S. Cl.
CPC ........ *H01M 10/625* (2015.04); *H01M 10/643* (2015.04); *H01M 2220/20* (2013.01); *Y02E 60/13* (2013.01)

(56) References Cited

U.S. PATENT DOCUMENTS

| | | | | |
|---|---|---|---|---|
| 2002/0012833 | A1* | 1/2002 | Gow | H01M 2/0242 429/120 |
| 2009/0286138 | A1* | 11/2009 | Shimamori | H01M 2/0257 429/53 |
| 2010/0099015 | A1* | 4/2010 | Kawai | H01M 10/625 429/62 |
| 2010/0112427 | A1* | 5/2010 | Tsutsumi | H01M 2/16 429/120 |
| 2010/0116468 | A1 | 5/2010 | Kimura | |
| 2010/0136404 | A1* | 6/2010 | Hermann | H01M 2/1016 429/120 |
| 2011/0111269 | A1 | 5/2011 | Tse | |
| 2011/0135984 | A1* | 6/2011 | Ekchian | H01M 10/482 429/97 |
| 2013/0017421 | A1 | 1/2013 | Onnerud et al. | |

FOREIGN PATENT DOCUMENTS

| | | |
|---|---|---|
| DE | 102009046496 A1 | 5/2011 |
| DE | 102011008792 A1 | 7/2012 |
| DE | 102011080706 A1 | 2/2013 |
| WO | WO-2014016069 A1 | 1/2014 |

* cited by examiner

ELECTRICAL STORAGE DEVICE THERMAL MANAGEMENT SYSTEMS

BACKGROUND OF THE INVENTION

1. Field of the Invention

The present invention relates to thermal management systems for electrical storage devices, and more particularly to thermal management systems for batteries and capacitors used for power storage in aircraft.

2. Description of Related Art

Advances in electronics and electronics functionality have led to a proliferation of power consuming devices integrated into vehicles. Modern automobiles include numerous processors to manage vehicle systems previous controlled by mechanical systems. Modern aircraft include fly-by-wire systems connecting processors and actuators in placed of hydraulic systems because of the need for additional on-board functionality and weight savings. Increase in power demand gives rise to a corresponding requirement for electrical storage devices capable of meeting this increased power demand. Of particular interest are power sources with greater power density than conventional sources, thereby being capable of supplying a greater amount of power for a given size and weight than conventional sources.

In the drive for greater power density, power sources such as batteries and capacitors have moved to increasingly energetic chemistries. These chemistries offer the advantage of decreased size (volume) and mass for a given power and energy requirement than otherwise available with conventional chemistries. For that reason, batteries employing chemistries like lithium-ion or lithium cobalt oxide chemistries have been incorporated into automotive and aerospace applications. However, some of these high energy chemistries are reported to have upper operating temperature limits above which the risk of thermal runaway increases.

Thermal runaway is a condition wherein the exothermic reaction associated supplying power accelerates beyond the capability to manage the generated heat. Increasing temperature leads to increased power output, leading in turn to further temperature increase. For that reason, vehicles may include features such as external passive or active cooling which function to keep electrical storage devices, e.g. batteries, below the temperature at which thermal runaway occurs. Conventional cooling systems may further include a capability to cool the power storage device once the battery is above its thermal runaway temperature.

Such conventional methods and systems have generally been considered satisfactory for their intended purpose. However, there is still a need in the art for a thermal management system that allows for improved power source cooling. There also remains a need in the art for an improved thermal management system that cools of power sources approaching and/or above temperatures at which thermal runaway occurs. There further remains a need in the art for a thermal management system that is easy to make and use, such as by allowing access to the batteries for servicing. The present invention provides a solution for at least one of these problems.

SUMMARY OF THE INVENTION

The subject invention is directed to a new and useful thermal management system such as for high density power sources. The system includes a housing with an interior divided by a bulkhead partition into first and second compartments. The first compartment is configured and adapted to house at least one electrical battery and the second compartment defines a coolant reservoir. The system also includes a fluid release member connecting the first and second compartments disposed in the partition, for example. Upon the first compartment reaching a temperature in excess of a predetermined limit, the fluid release member releases coolant from the second compartment into the first compartment to cool the at least one battery within the first compartment.

In accordance with certain embodiments, the system includes a vent operatively connected to the housing to release vapor above a predetermined pressure from the interior of the housing. The vent can be configured and adapted to place the coolant reservoir in fluid communication with an environment external to the housing. The vent can be a snap disk, a pressure relief valve, or a burst disk in series with a pressure regulator.

In certain embodiments the fluid release member opens by expansion of paraffin. In other embodiments the fluid release member is a thermostatic valve that opens by fracturing of a vial of volatile liquid or melting of a low temperature alloy. In other embodiments the fluid release member opens upon triggering by an external sensor. In still other embodiments the fluid release member is a valve operatively connected to a sensor configured and adapted to operate the valve.

In certain embodiments, the first compartment has at least one divider mounted therein for separating a plurality of batteries from one another. The divider can be a divider bulkhead with a pair of divider tabs extending from respective end of the divider bulkhead. The divider can be constructed from a solid material. The divider can define a plurality of bores extending through the bulkhead for providing insulation. The divider can include a layer of thermal insulation material. For example, the thermal insulation material may have a first surface and a second surface, and the divider bulkhead may have a thermally conductive layers disposed over the first and second surfaces.

It is also contemplated that, in certain embodiments, the first compartment includes a plurality of batteries and a controller disposed within the housing. The first compartment can also include a controller configured and adapted to reconfigure connections around each of the batteries. For example, the controller can monitor battery temperature and reconfigure battery connections around a battery with a battery temperature above the predetermined temperature. In certain embodiments the controller can be operatively connected to an aircraft monitoring system, and the controller configured and adapted to annunciate coolant release from the second compartment into the first compartment.

In certain embodiments, the vent is fluidly communicative with a duct extending to an environment external of an aircraft. The housing can include a first module with the first compartment and a second module with the second compartment and the first module is severable from the second module.

The invention also provides a thermal management system with a housing having an interior divided into first and second compartments. The first compartment is configured and adapted to house at least one capacitor and the second compartment defines a coolant reservoir. The system also includes a fluid release member is configured and adapted to release coolant from the second compartment into the first compartment using gravity to cool the at least one capacitor with a first compartment temperature in excess of a predetermined limit.

The invention further provides an aircraft power source thermal management system. The system includes a housing with an interior and a partition disposed within the housing interior. The partition divides the interior into first and second compartments, the first compartment including a plurality of vehicle electrical power storage devices and the second compartment includes a dielectric fluid. A fluid release member is disposed in the partition and has a first and a second configurations, the fluid release member isolating the dielectric fluid from the first compartment in its first configuration and fluidly connecting the second compartment with the first compartment in its second configuration. A relief device is disposed in the housing and has a first and a second configuration, the relief device isolating the second compartment from the environment external to the housing in its first configuration and the fluidly connecting the first and second compartments with the environment external of the housing in its second configuration.

In certain embodiments the fluid release member channels the dielectric fluid from the second compartment to the first compartment in a liquid phase in its second configuration, and also channels the dielectric fluid from the second compartment to the first compartment in a vapor phase in the second configuration.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein with reference to certain figures, wherein.

DETAILED DESCRIPTION OF THE PREFERRED EMBODIMENTS

Figure 1:
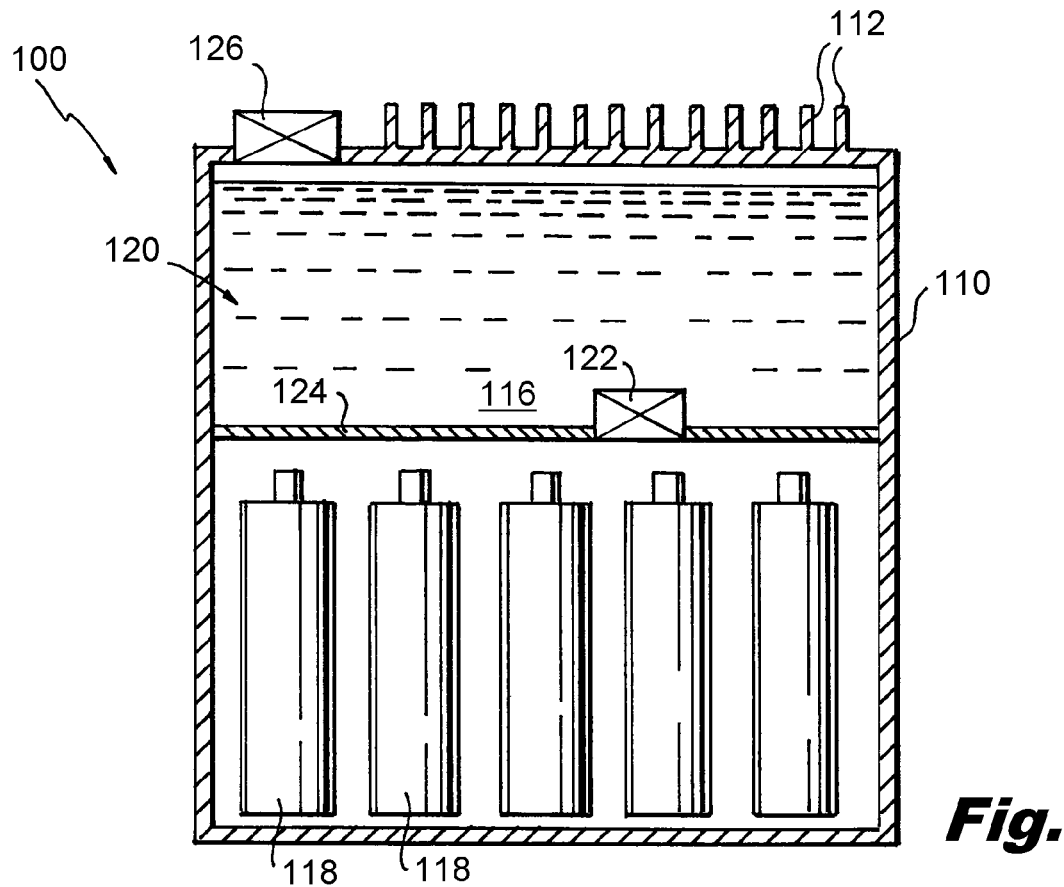
FIG. 1 is a cross-sectional side elevation view an exemplary thermal management system constructed in accordance with the present invention, showing the coolant reservoir and battery compartment.

Reference will now be made to the drawings wherein like reference numerals identify similar structural features or aspects of the subject invention. For purposes of explanation and illustration, and not limitation, a partial view of an exemplary embodiment of a thermal management system in accordance with the invention is shown in FIG. 1 and designated with a reference numeral 100. Other embodiments of thermal management systems in accordance with the invention or aspects thereof are provided in FIGS. 2-4, as will be described. Applicant describes the power source herein as a battery. This is for illustrative purposes only and non-limiting. As will be appreciated, the power source can be any suitable source of electrical power such as conventional or high energy chemistry batteries as well as capacitors. The thermal management system of the invention can be used for management of vehicle power source temperature, and more specifically but without limitation thermal management of aircraft batteries having high power densities, or in any other suitable application.

Referring now to FIG. 1, thermal management system 100 is shown. System 100 includes a housing 110 with an interior divided into a first compartment 114 and a second compartment 116. First compartment 114 houses electrical batteries 118 and second compartment 116 defines a fluid (coolant) reservoir 120. System 100 also includes a fluid release member 122 connecting the first and second compartments (114 and 116). Upon the first compartment reaching a temperature in excess of a predetermined limit (not shown), fluid release member 122 releases coolant from the second compartment 116 into the first compartment 114 to cool batteries 118 within first compartment 114. Fluid release member 122 is disposed within a partition 124 separating first compartment 114 from second compartment 116. Partition 124 can also be a partition that maintains fluid in a reservoir during normal operation of batteries 118. Housing 110 optionally includes active and/or passive cooling component that can include a plurality of fins 112 disposed across at least a portion of a surface of the housing.

First compartment 114 can be a battery box substantially sealed to withstand internal pressure. First compartment 114 further can be configured and adapted to tolerate a small amount of leakage through openings in housing 110, such as for wire feedthroughs and/or conduits. Second compartment 116 can be a sealed fluid reservoir containing an inert dielectric fluid having a suitable temperature/pressure curve, such as a fluorocarbon. First and second compartments (114 and 116) can be severable, meaning they can be readily removed and reattached without disturbing the respective contents of the compartments. Advantageously, embodiments having severable compartments (114 and 116) provide ready access for battery maintenance, servicing and/or replacement.

System 100 also includes a relief device 126 operatively connected to housing 110 to release vapor above a predetermined pressure from the interior of housing 110, including from second compartment 116. Relief device 126 is configured and adapted to place the coolant reservoir 120 within second compartment 116 in fluid communication with an environment external to housing 110. Relief device 126 can be a vent, a pressure relief device comprising a snap disk, a pressure relief valve, or a burst disk. Relief device 126 can also be a burst disk in series with a pressure regulator 348 (shown in FIG. 3). Relief device 126 can optionally be in fluid communication with a duct 346 (shown in FIG. 3) which is in turn in fluid communication with an environment external to an aircraft. This provides for conveying fluid vapors outside of the aircraft and eliminating vapors from the aircraft interior.

Fluid release member 122 can open by expansion of a paraffin element, can be a thermostatic valve that opens by fracturing of a vial of volatile liquid or the melting of a low temperature alloy, can be a detonating device operably connected to a sensor (shown in FIG. 3) configured and adapted to trigger the detonating device, can be a valve operatively connected to a sensor (shown in FIG. 3) configured and adapted to operate the valve, and/or can be any suitable type of release member. Fluid release member 122 can be a remote sensing thermally operated valve, such as a fluid filled bulb and capillary tube connected to an actuator diaphragm mechanically communicative with the release member for example. Advantageously, embodiments including remote sensing thermally operated valves sense temperature relatively close to the batteries or area of interest and do not require electrical power.

Figure 2A:
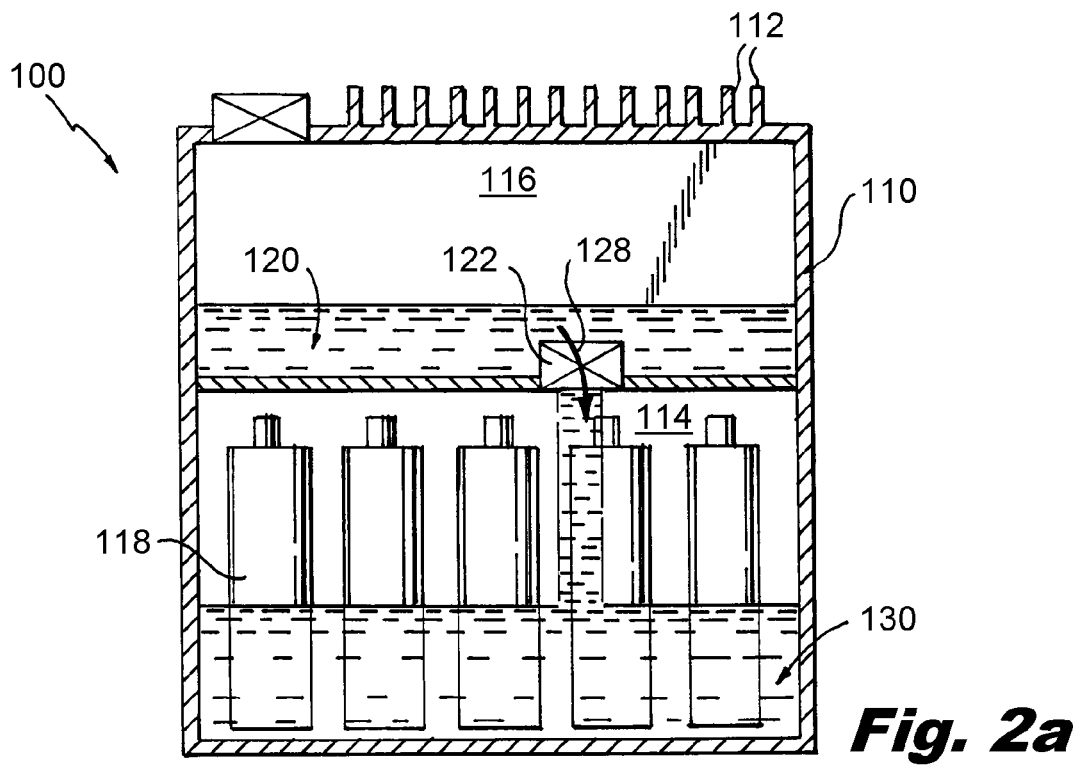
FIG. 2A and FIG. 2B are cross-sectional side elevation views of the system of FIG. 1, respectively showing the fluid release member in a flowing configuration and the fluid release member and the relief device in flowing configurations.

Referring now to FIG. 2A, thermal management system 100 is shown with fluid release member 122 in a second configuration. Fluid release member 122 moves from a first, closed configuration to a second, open configuration, upon reaching a predetermined temperature. As will be appreciated, the predetermined temperature is a temperature associated with at least one of batteries 118 approaching, reaching, and/or exceeding the temperature at which the battery chemistry enters thermal runaway. The predetermined temperature can be a direct temperature measurement, such as by a transducer in contact with battery 118, or an indirect measurement such as by measuring structure or space in the vicinity of battery 118. For example, indication of battery temperature can be extrapolated from measurement of environmental temperature within first compartment 114, measurement of the temperature of a structural element of housing 110, measurement of temperature of partition 126, or temperature of a structural element of a divider (shown in FIG. 5) arranged within second compartment 116. As indicated by flow arrow 128, fluid from reservoir 120 flows from second compartment 116, through fluid release member 122, and into first compartment 114, thereby forming a cooling reservoir 130 within first compartment 114 and bathing at least one of the batteries 118. As will be appreciated, fluid bathing batteries 118 can be in intimate fluidic contact with at least one of the batteries 118 to absorb heat by at least one of sensible heat (through increase of temperature) and or latent heat (through vaporization) from the at least one battery 118.

With further reference to FIG. 2A, the fluid-filled first compartment 114 is positioned above battery-containing second compartment 118. Advantageously, this allows for fluid movement from first chamber 114 to second chamber 116 by operation of gravity, and does not require operation of a pump or other active cooling means.

Figure 2B:
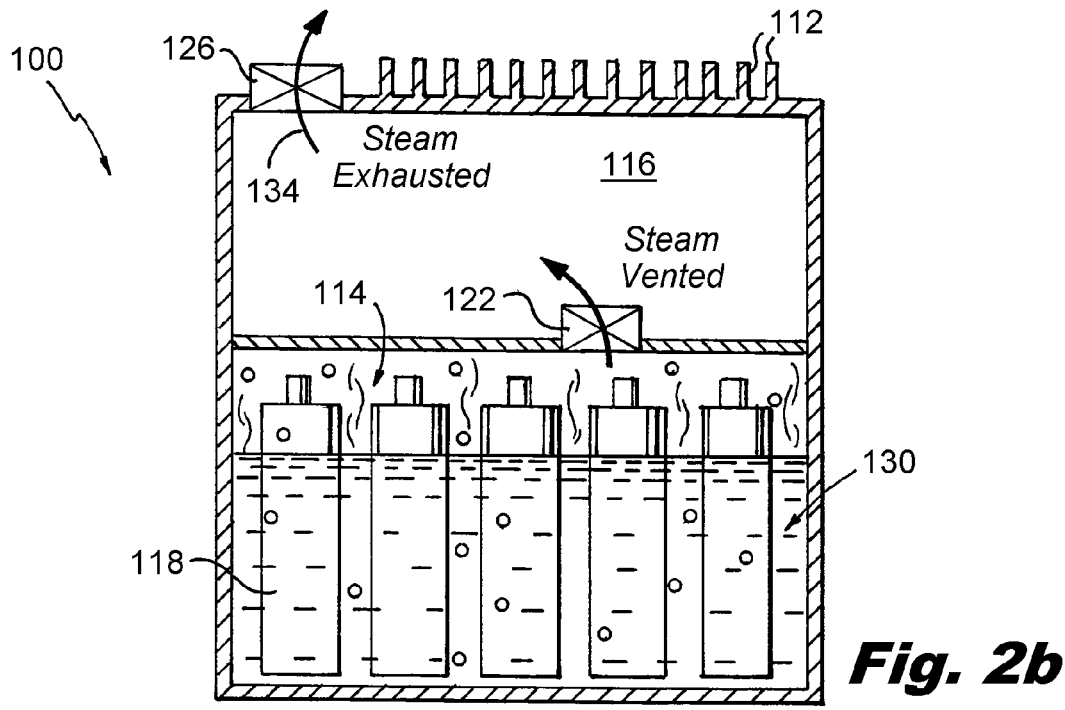

Referring now to FIG. 2B, thermal management system 100 is shown with fluid release member 122 and relief device 126 in their respective open flowing configurations. As one or more one of batteries 118 heats fluid reservoir 130, the fluid absorbs heat from the battery and rises in temperature. Fluid reservoir 130 absorbs the heat of the battery by sensible heating to the boiling point at the pressure within first compartment 114, and then absorbs further latent heat through vaporization. Fluid vaporization initially causes vapor to collect in first compartment 114, thereby giving rise to corresponding pressure increase within first compartment 114. As indicated in the figure by flow arrow 132, fluid vaporization drives vapor through fluid release member 1 and into second compartment 116, and thereby giving rise to corresponding pressure increase with second compartment 116. Continued heating of fluid 130 by battery 118 can further increase the pressure within first and second compartments (114 and 116) to reach a predetermined pressure value at which point relief device 126 moves to its second, open configuration. As indicated in FIG. 2B by flow arrow 134, fluid vapor thereafter exits the housing interior through relief device 126, thereby causing corresponding pressure drop within first and second compartments (114 and 116).

Figure 3:
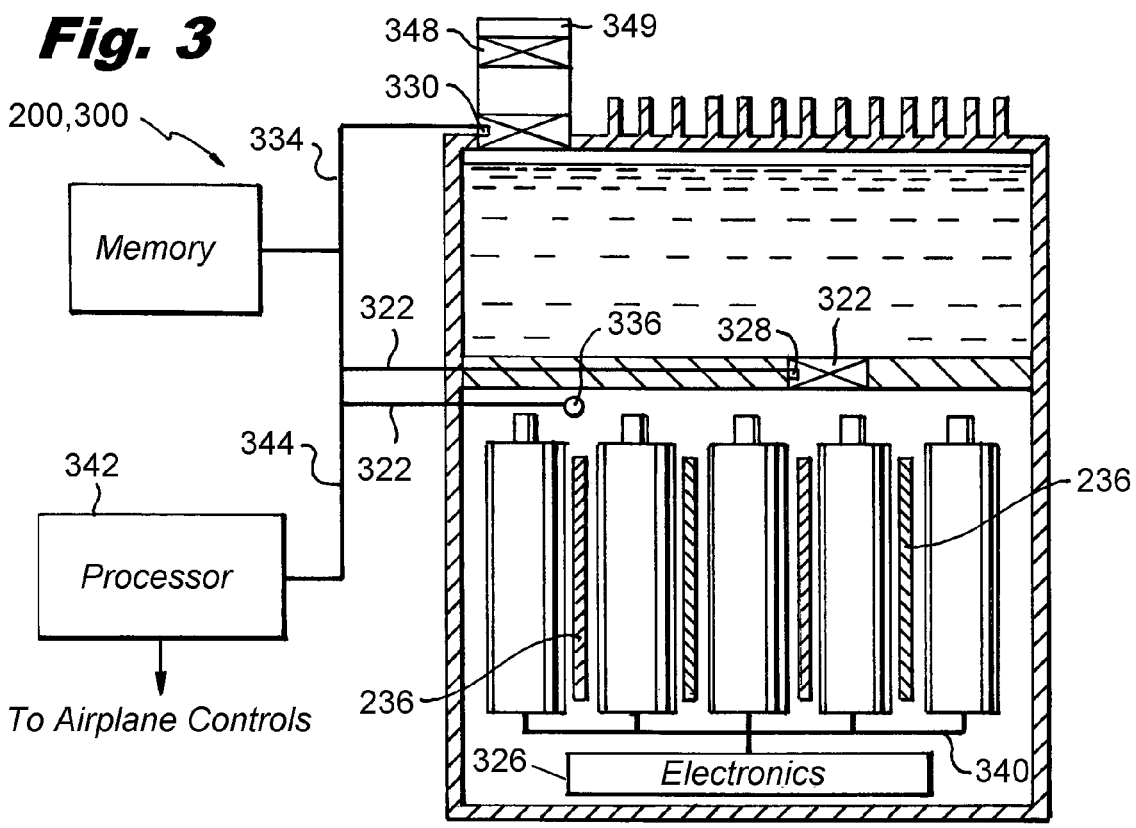
FIG. 3 is a cross-sectional side elevation view of another exemplary embodiment of a thermal management constructed in accordance with the present invention, showing a divided power source compartment and having a monitoring module connected to battery cells within the battery compartment.

Referring now to FIG. 3, a thermal management system 200/300 is shown. System 200 is similar to system 100 and additionally includes bulkhead divider 236 mounted within first compartment 214. Divider 236 separates batteries 218 disposed within first compartment 214 from adjacent batteries 218. It is further contemplated that at least a portion of divider 216 can be in intimate mechanical contact with a portion of an interior of housing 210, fluidly sealing a divided portion of first compartment 214. The contact can be across a joint defined by a portion of the periphery of divider 236 and at least one of walls or floor of first compartment 214. It is further contemplated the divider could optionally extend to the lower surface of partition 226 and have an associated fluid release member 122 disposed in partition 124, the first compartment having divided sections respectively housing individual batteries with associated fluid release members.

With continued reference to FIG. 3, a thermal management system 300 is also shown. Thermal management system 300 is similar to system 100, and includes battery monitoring electronics 326, fluid release member sensor 328, and relief device sensor 330. Battery monitoring electronics 326 are communicatively coupled to fluid release member sensor 328 through a link 332, and are configured and arranged to control movement of fluid release member 322 from its first configuration (closed) to its second configuration (open) based on feedback from sensor 328. Battery monitoring electronics 326 are also communicatively coupled to relief device sensor 330 through a link 334, and are also configured and arranged to control movement of relief device 324 from its first configuration (closed) to its second configuration (open) based on feedback from sensor 330. Battery monitoring electronics 326 can further be communicatively coupled to a first compartment temperature sensor 336 through a link 338, and are further configured and arranged to receive compartment temperature measurements from sensor 336. Battery monitoring electronics 326 can additionally be operatively coupled batteries 318 through monitoring and power distribution connections 340, and are additionally configured and arranged to monitor at least one parameter of batteries 318 and reconfigure battery connections around a malfunctioning battery, thereby continuing to provide power if necessary for continued operation of the vehicle. Battery monitoring electronics 326 can also be communicatively coupled to an external controller 342 through a link 344, to report system information, e.g. annunciate at least one of opening of fluid release member 322, opening of relief device 324, and internal battery temperature information from sensor 336 to the external controller 342. External controller 342 can be an aircraft monitoring system, for example.

In operation battery temperature is maintained within the housing by any one of a number of existing control methods including thermal conduction through the first compartment 114 wall to the surrounding ambient. If a battery temperature rises above a predetermined value, battery monitoring electronics 326 cause system 300 to (a) annunciate the battery temperature condition to aircraft monitoring system 342, and/or (b) reconfigure battery connectivity, thereby continuing to supply power to the vehicle from non-malfunctioning batteries. In the event that battery temperature rises about a predetermined level, system 300 (c) releases fluid from second compartment 316 into first compartment 314 by combining the compartments through operation of fluid release member 322, (d) removes heat from battery 318 by increasing the temperature of at least a portion of the released fluid, and/or (e) removes additional heat from battery 318 by vaporizing at least a portion of the released fluid. In the event that pressure reaches a predetermined pressure, system 300 further (f) vents the compartments (314 and 316) to the environment external to the system, and (g) annunciates the opening of the relief device 324 to the aircraft monitoring electronics 342. The relief device can include an upstream pressure regulating function to limit the release of vapor and thus maintain internal pressure of compartments 114 and 116 within prescribed limits. The temperature of the fluid within these compartments will then be maintained within prescribed limits depending on the temperature/pressure curve of the selected fluid 120. Operation of the system can, for example, allow for continued operation of the vehicle until such time as the cause of battery overheating can be resolved.

In an embodiment, fluid release member sensor 328 and the relief device 324 to operate mechanically, without an external prompt by a controller. The electrical sensors report the operation to an external controller communicatively coupled to aircraft controls.

Figure 4A:
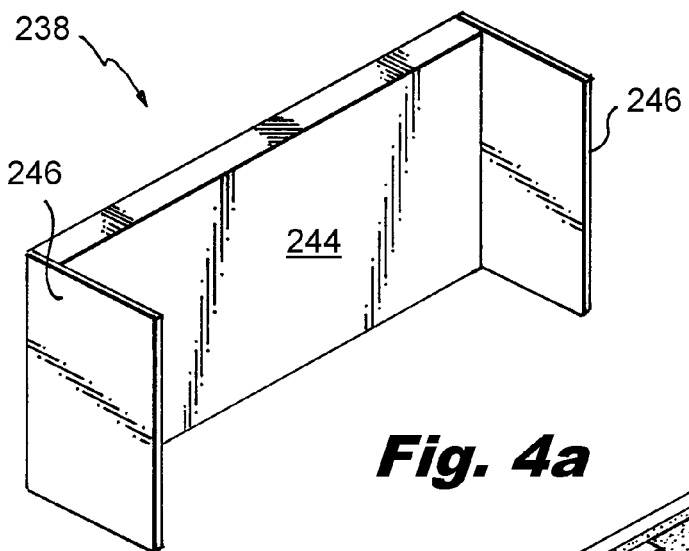
FIG. 4A, FIG. 4B, and FIG. 4C are perspective views of exemplary embodiments of dividers for use with embodiments of the thermal management systems of FIG. 3.
Figure 4B:
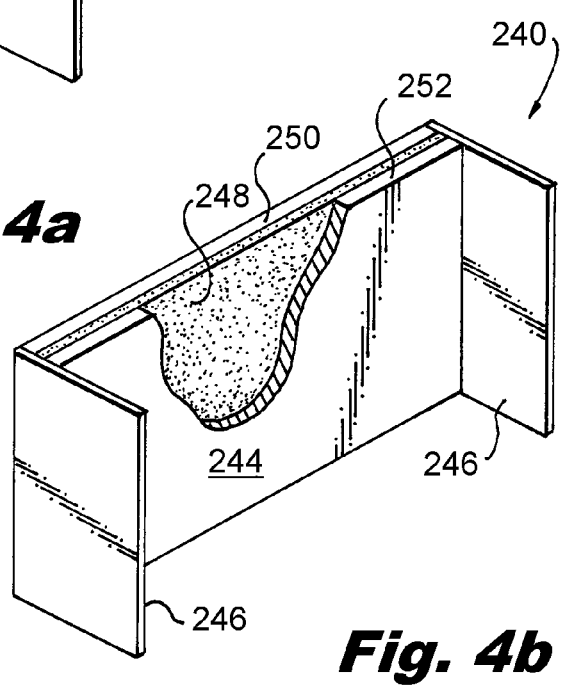
Figure 4C:
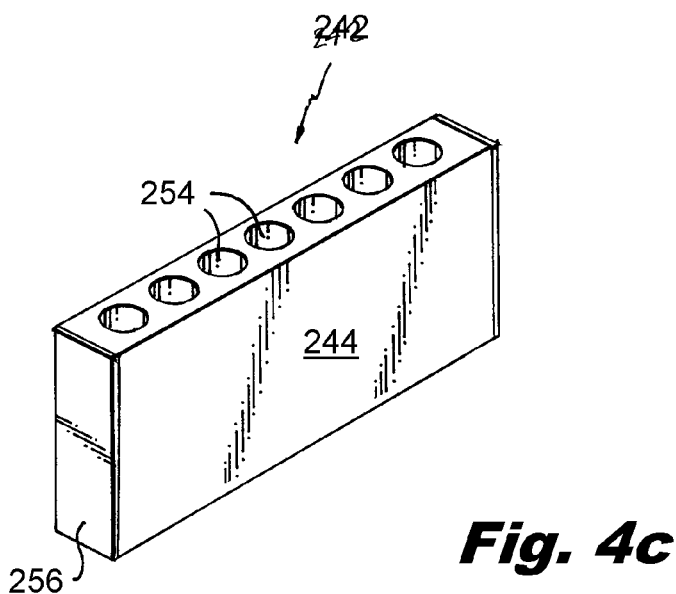

Referring now to FIGS. 4A-4C, bulkhead dividers (238, 240, and 242) suitable for use with embodiments of thermal management systems are shown. FIG. 4A shows a solid divider 238. Divider 238 includes a bulkhead portion 244 and optionally includes at least one tab portion 246 at each end of bulkhead 244. Tabs 246 are configured and arranged to engage interior surfaces of housing 210 such as by screws or clamps for example, thereby providing mechanical and thermal connection to first compartment 214 housing interior. Divider 238 can be constructed from metal, composite, or a combination of metal and composite materials, for example.

FIG. 4B shows insulated divider 240. Divider 240 is similar to divider 238 and additionally includes a center thermal insulating layer 248. Insulating layer 248 includes a first surface opposing a second surface, and further includes at least one thermally conductive layer disposed on at least one of first and second surfaces. In the illustrated embodiment, thermally conductive layers are disposed on both opposed insulating layer surfaces, the layers each having a periphery configured and adapted to couple thermally with the interior of first compartment 214. Insulating layer 248 can advantageously reduce the thermal conductivity from otherwise adjacent batteries 218, thereby limiting propagation of thermal runaway across batteries while retaining good thermal conduction from battery cells to battery housing 210.

FIG. 4C shows divider 242 having a plurality of passages (bores) 254 extending through the divider bulkhead portion 244. Bores 254 respectively define air-filled spaces between opposing surfaces of divider 242 that insulate each surface from the opposite surface according to divider thickness 256, bore diameter, and bore spacing. Bores 254 advantageously reduce thermal conductivity from adjacent batteries 218, thereby limiting propagation of thermal runaway across batteries while retaining good thermal conduction from battery cell to the battery housing 210. Bores 254 also provide additional surface area for convective heat transfer to fluid released into first compartment 214. As shown in FIG. 4C, divider 242 does not include tabs, e.g. 246. This is for illustration purposes and non-limiting, and in other embodiments (not shown) divider 242 can have at least one tab portion. Operatively, one more fluid release members can deposit fluid into either or both a battery cell and divider cell. Advantageously, in embodiments where fluid enters the divider bores the rate of heat transfer to the fluid is increased.

While described in the exemplary context of batteries for vehicles, and in particular aircraft, those skilled in the art will readily appreciate that the systems and methods described herein can be used in any other suitable application including other vehicles and stationary applications.

The systems and methods and systems of the present invention, as described above and shown in the drawings, provide a thermal management system for power sources that reduce potential for damage and damage propagation from a failed battery cell. Vehicles, such as aircraft are less susceptible to damage from batteries experiencing thermal runaway or other malfunction mechanisms. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A thermal management system comprising:
   a housing having an interior;
   a partition disposed within the housing interior and dividing the interior into first and second compartments, the first compartment being configured and adapted to house at least one electrical battery, and the second compartment defining a coolant reservoir;
   a fluid release member disposed in the partition and operably connecting between the first and second compartments to release coolant from the second compartment into the first compartment to cool the at least one battery with a first compartment temperature in excess of a predetermined limit
   wherein the fluid release member has a first configuration and a second configuration, the fluid release member fluidly isolating the second compartment from the first compartment in the first configuration,
   wherein the coolant reservoir contains a coolant fluid sealed within the coolant reservoir,
   wherein the coolant reservoir is positioned adjacent to and above the first compartment to allow coolant movement from the coolant reservoir to the first compartment without requiring operation of a pump or other active cooling means when the fluid release member is in the second configuration.

2. A thermal management system as recited in claim 1, further comprising a vent operatively connected to the housing to release vapor above a predetermined pressure from the interior of the housing.

3. A thermal management system as recited in claim 2, wherein the vent is configured and adapted to place the coolant reservoir in fluid communication with an environment external to the housing.

4. A thermal management system as recited in claim 2, wherein the vent is of type selected from the group consisting of a snap disk, a pressure relief valve, and a burst disk in series with a pressure regulator, wherein the pressure regulator is configured and adapted to maintain the first and second compartments within prescribed pressure limits.

5. A thermal management system as recited in claim 1, wherein the fluid release member is of a type selected from the group consisting of (a) a thermostatic valve configured and adapted to open by expansion of paraffin, (b) a thermostatic valve configured and adapted to open by the fracturing of a vial of volatile liquid or melting of a low temperature alloy, (c) an internal detonation device configured and adapted for triggering by an external sensor, (d) a valve operatively connected to a sensor configured and adapted to open the valve, and (e) a mechanically actuated valve and a sensor configured and adapted to report actuation of the valve.

6. A thermal management system as recited in claim 1, wherein a bulkhead separates the first and second compartments, and wherein the fluid release member in the bulkhead.

7. A thermal management system as recited in claim 1, further comprising at least one divider mounted within the first compartment for separating a plurality of batteries from one another.

8. A thermal management system as recited in claim 7, wherein the at least one divider includes a divider bulkhead and a pair of divider tabs extending therefrom, one at each end thereof.

9. A thermal management system as recited in claim 7, wherein the at least one divider includes a divider bulkhead of a solid material.

10. A thermal management system as recited in claim 7, wherein the at least one divider includes a divider bulkhead including a plurality of bores defined therethrough for providing reduced through conduction and enhanced convective heat transfer area.

11. A thermal management system as recited in claim 7, wherein the at least one divider includes a divider bulkhead including a layer of thermal insulation material.

12. A thermal management system as recited in claim 10, further comprising a thermal insulation material having a first surface and a second surface, wherein the divider bulkhead further comprises thermally conductive layers disposed over the first and second surfaces of the thermal insulation layer.

13. A thermal management system as recited in claim 1, wherein the first compartment includes a plurality of batteries and a controller disposed within the housing, wherein the controller is configured and adapted to reconfigure connections around each of the batteries.

14. A thermal management system as recited in claim 13, wherein the controller is configured and adapted to monitor battery temperature and reconfigure battery connections around battery with a temperature above the predetermined temperature.

15. A thermal management system as recited in claim 13, wherein controller operatively connected to an aircraft monitoring system, and wherein the controller is configured and adapted to annunciate coolant release from the second compartment into the first compartment.

16. A thermal management system as recited in claim 1, wherein the vent is fluidly communicative with a duct configured and arranged to extend to an environment external of an aircraft.

17. A thermal management system as recited in claim 1, wherein the housing comprises a first module including the first compartment and a second module including the second compartment, wherein the first module is severable from the second module.

18. A Thermal management system comprising:
a housing having an interior;
a partition disposed within the housing interior and dividing the interior into first and second compartments, the first compartment being configured and adapted to house at least one capacitor, and the second compartment defining a coolant reservoir; and
a fluid release member disposed in the partition and operably connecting between the first and second compartments, wherein the fluid release member is configured and adapted to release coolant from the second compartment into the first compartment using gravity to cool the at least one capacitor with a first compartment temperature in excess of a predetermined limit,
wherein the coolant reservoir contains a coolant fluid sealed within the coolant reservoir,
wherein the coolant reservoir is positioned adjacent to and above the first compartment to allow coolant movement from the coolant reservoir to the first compartment without requiring operation of a pump or other active cooling means upon release by the fluid release member into the first compartment.

19. A thermal management system comprising:
a housing with an interior;
a partition disposed within the housing interior and dividing the interior into first and second compartments, wherein the first compartment includes a plurality of vehicle electrical power storage devices, wherein the second compartment defining a coolant reservoir and containing a dielectric fluid;
a fluid release member disposed in the partition and having first and second configurations, wherein in the first configuration the fluid release member isolates the dielectric fluid from the first compartment, wherein in the second configuration the fluid release member fluidly connects the second compartment with the first compartment; and
a relief device disposed in the housing and having first and second configurations, wherein in the first configuration the relief device isolates the second compartment from the environment external to the housing, wherein in the second configuration the relief device fluidly connects the first compartment to the external environment through the second compartment when the fluid relief member is in the fluid release member second configuration;
wherein the coolant reservoir contains a coolant fluid having the dielectric fluid and sealed within the coolant reservoir,
wherein the coolant reservoir is positioned adjacent to the partition and above the first compartment to allow coolant movement from the coolant reservoir to the first compartment without requiring operation or a pump of other active cooling means when the fluid release member is in the second configuration.

20. A thermal management system as recited in claim 19, wherein the fluid release member channels the dielectric fluid from the second compartment to the first compartment in a liquid phase, and channels the dielectric fluid from the second compartment to the first compartment in a vapor phase in the second configuration.

* * * * *